(12) United States Patent  (10) Patent No.: US 7,017,968 B1
Radu et al.  (45) Date of Patent: Mar. 28, 2006

(54) AUTOMOTIVE ASHTRAY HAVING AN ELECTROLUMINESCENT LAMP AND METHOD OF MAKING THE SAME

(75) Inventors: Bogdan Radu, Dearborn, MI (US); Alan G. Dry, Grosse Point Woods, MI (US)

(73) Assignee: Lear Corporation, Southfield, MA (US)

( * ) Notice: Subject to any disclaimer, the term of this patent is extended or adjusted under 35 U.S.C. 154(b) by 0 days.

(21) Appl. No.: 10/711,652

(22) Filed: Sep. 29, 2004
(Under 37 CFR 1.47)

(51) Int. Cl.
*B60N 3/12* (2006.01)

(52) U.S. Cl. ..................... 296/37.9; 131/231

(58) Field of Classification Search ............... 296/37.9, 296/37.8, 37.12, 208, 37.1, 153; 131/231, 131/242, 238, 735.1, 241, 240.1; 206/246; 224/281; 297/288.14; 445/22; 200/549; 362/84; 313/498, 509, 483, 503, 512, 493, 313/506; 252/301.4 R
See application file for complete search history.

(56) References Cited

U.S. PATENT DOCUMENTS

| | | | | |
|---|---|---|---|---|
| 2,755,406 A | * | 7/1956 | Burns | 313/498 |
| 2,851,585 A | | 9/1958 | Glowzinski | |
| 2,901,652 A | * | 8/1959 | Fridrich | 313/509 |
| 3,012,164 A | * | 12/1961 | Franzone et al. | 313/483 |
| 3,014,873 A | * | 12/1961 | Burns | 252/301.4 R |
| 3,015,044 A | * | 12/1961 | Burns | 313/503 |
| 3,317,722 A | * | 5/1967 | Whitney | 313/512 |
| 4,619,624 A | * | 10/1986 | Kerr et al. | 445/22 |
| 4,996,995 A | * | 3/1991 | Kojima | 131/238 |
| 5,002,074 A | * | 3/1991 | Kimisawa | 296/37.9 |
| 5,018,800 A | | 5/1991 | Cziptschirsch et al. | 312/344.1 |
| 5,144,963 A | | 9/1992 | Dabringhaus et al. | 131/231 |
| 5,199,449 A | | 4/1993 | Dabringhaus et al. | 131/231 |
| 5,350,894 A | * | 9/1994 | Allison | 200/549 |
| 5,440,458 A | * | 8/1995 | Volk | 362/84 |
| 5,466,990 A | * | 11/1995 | Winsor | 313/493 |
| 5,489,054 A | * | 2/1996 | Schiff | 296/37.9 |
| 5,533,772 A | | 7/1996 | Volkers et al. | 296/37.9 |
| 5,645,340 A | * | 7/1997 | Colton | 296/37.9 |
| 5,730,491 A | * | 3/1998 | Carlsen et al. | 297/188.14 |
| 5,780,965 A | | 7/1998 | Cass et al. | 313/506 |
| 6,000,822 A | | 12/1999 | Polizzi et al. | |
| 6,013,956 A | | 1/2000 | Anderson, Jr. | |
| 6,036,592 A | * | 3/2000 | Rubin | 131/240.1 |
| 6,106,261 A | | 8/2000 | von Holdt | 425/130 |
| 6,116,672 A | | 9/2000 | Cannon et al. | |

(Continued)

FOREIGN PATENT DOCUMENTS

DE 4141297 6/1993

*Primary Examiner*—Kiran B. Patel
(74) *Attorney, Agent, or Firm*—Wood, Herron & Evans, L.L.P.

(57) ABSTRACT

An automotive ashtray comprises a compartment body defining a cavity and having an opening for accessing the cavity. The compartment body includes a first connecting member integrally formed therein. The ashtray further includes a cover having a second connecting member integrally formed therein, the first connecting member cooperating with the second connecting member to moveably couple the cover to the compartment body. An electroluminescent lamp is molded to the compartment body to illuminate the cavity. A two-shot molding process may be used to form the ashtray, with the compartment body and the first connecting member being formed in the first shot. The electroluminescent lamp is molded to the compartment body in the first shot. The cover and the second connecting member are then formed in the second shot so that the cover is pivotally coupled to the compartment body.

7 Claims, 4 Drawing Sheets

U.S. PATENT DOCUMENTS

| | | |
|---|---|---|
| 6,193,399 B1 | 2/2001 | Hulse |
| 6,196,606 B1 | 3/2001 | McGoldrick |
| 6,217,201 B1 | 4/2001 | Hulse |
| 6,296,796 B1 | 10/2001 | Gordon ................. 264/255 |
| 6,419,379 B1 | 7/2002 | Hulse |
| 6,464,381 B1 | 10/2002 | Anderson, Jr. et al. |
| 6,523,544 B1 * | 2/2003 | Ritter et al. ............. 131/240.1 |
| 6,536,928 B1 | 3/2003 | Hein et al. |
| 6,562,275 B1 | 5/2003 | Martinez ................. 264/308 |
| 6,594,417 B1 | 7/2003 | Hulse |
| 6,652,128 B1 | 11/2003 | Misaras |
| 6,656,397 B1 | 12/2003 | Hansen et al. |
| 6,702,354 B1 | 3/2004 | Galijasevic ............... 296/37.1 |
| 2001/0030871 A1 | 10/2001 | Anderson, Jr. et al. |
| 2001/0053082 A1 | 12/2001 | Chipalkatti et al. |
| 2003/0002273 A1 | 1/2003 | Anderson, Jr. et al. |
| 2003/0075944 A1 | 4/2003 | Galijasevic ............... 296/37.1 |
| 2004/0017687 A1 | 1/2004 | Misaras |
| 2004/0119308 A1 * | 6/2004 | Kawaguchi et al. ....... 296/37.9 |
| 2005/0067952 A1 * | 3/2005 | Fechter et al. ............. 313/506 |

* cited by examiner

AUTOMOTIVE ASHTRAY HAVING AN ELECTROLUMINESCENT LAMP AND METHOD OF MAKING THE SAME

The present invention is related to U.S. Ser. No. 10/710,499, filed Jul. 15, 2004, U.S. Ser. No. 10/711,385, filed Sep. 15, 2004, U.S. Ser. No. 10/711,462, filed Sep. 20, 2004, U.S. Ser. No. 10/711,463, filed Sep. 20, 2004, U.S. Ser. No. 10/711,480, filed Sep. 21, 2004 and U.S. Ser. No. 10/711,636, filed Sep. 29, 2004.

FIELD OF THE INVENTION

The present invention pertains generally to automotive interiors and more particularly to ashtrays for automotive interiors.

BACKGROUND OF THE INVENTION

It is known to provide automotive interiors with various trim assemblies to improve the aesthetic appearance of the automotive interior and for the comfort and convenience of vehicle occupants. Examples of these interior trim assemblies include the instrument panels, armrests, door trim panels and consoles. In many of these trim assemblies, various compartments are incorporated therein that allow the vehicle occupant to conveniently store one or more items, such as tissue, coins, cigarette or cigar butts and ashes, and the like for later removal or disposal thereof. In many cases, such as for ashtray compartments in door panels or rear interior side panels, it is desirable for the compartment to include a door or cover that overlies the opening and secures the items within the compartment. The cover is typically attached to the compartment and moveable, such as by a hinge mechanism, so that the articles in the compartment may be accessed.

Moreover, in more luxury-oriented vehicles, manufacturers may provide various lighting systems in the trim assemblies that enhance the use of the various functional aspects typically found in the interior of an automobile. For instance, a lighting system may be provided with the ashtray so that the opening or cavity of the ashtray may readily be seen during night time conditions or other conditions when the ashtray may not be readily observed. In this way, when vehicle occupants need to deposit an item, such as ashes, in the ashtray, the ashtray opening may be observed and the ashes deposited therein without turning on overhead lighting, which may disturb other vehicle occupants. Perhaps more importantly, however, the lighting system also helps prevent occupants from missing the ashtray altogether and burning either themselves or the interior of the vehicle with the hot ashes. While being desired by car owners and vehicle occupants, ashtrays incorporating a lighting system have some drawbacks. A primary drawback is in the manufacturing and assembly of the various parts that make up the ashtray and the lighting system. The current process for making an automotive ashtray is typically to form the ashtray body in a first mold. The ashtray door is then individually formed in a second and separate mold. A further separate connecting member, usually being a pair of metal or plastic cylindrical hinge pins, is then used to couple the ashtray door to the ashtray body. Moreover, current ashtrays typically include a pair of damping mechanisms to provide some resistance to opening and closing the door to the ashtray.

To incorporate the lighting system with the ashtray, a portion of the ashtray body is cut out and covered by a clear polycarbonate material that in essence, provides a window to the interior of the ashtray. A separate light assembly is then attached to the inside of the trim assembly into which the ashtray is inserted so as to be located adjacent the window in the ashtray body. In this way, the light assembly emits light through the window and illuminates the interior of the ashtray. The light assembly typically includes multiple parts, such as an incandescent light bulb, a bulb mounting structure, a light cover, light reflectors and heat stake bosses to manage the heat generated by the incandescent bulb. The light assembly may further include contact switches so that the light bulb can be activated when the door to the ashtray is opened.

Thus, under current manufacturing processes, ashtrays having a lighting system provided therewith comprise numerous parts each having different part numbers that must all be appropriately supplied, tracked, shipped, inventoried and eventually assembled to make the complete product. Multiple part assemblies in turn lead to significant administrative costs and labor costs, which increase the overall costs of production.

There is a need for an improved automotive ashtray having a lighting system and a method for making the same that reduces the number of parts and reduces the labor required for assembly thereof, thereby reducing overall manufacturing costs.

SUMMARY OF THE INVENTION

The present invention provides for an improved automotive ashtray with a lighting system having a reduced number of parts and that is adapted to be coupled to an interior trim assembly, such as a door panel, of a vehicle. To this end, the ashtray includes a compartment body defining a cavity having an opening and adapted to store one or more items in the cavity such as coins, cigarette and cigar butts and ashes, and the like. The compartment body has a first connecting member integrally formed therein. The ashtray further includes a cover having a second connecting member integrally formed therein. The first connecting member and the second connecting member cooperate to pivotally couple the cover to the compartment body. In this way, the ashtray cover may be opened and closed to allow access to the cavity. Additionally, an electroluminescent lamp is coupled to either the compartment body or the cover and adapted to illuminate the ashtray cavity when the cover is in the open position.

The automotive ashtray may be formed by a two shot molding operation. The electroluminescent lamp is inserted into a mold and a first mold chamber is formed about the electroluminescent lamp. In a first shot of the molding operation, a first curable material is injected into the first mold chamber to form the first element, i.e. the compartment body or cover, having a first integrated connecting member. During the first shot, the electroluminescent lamp is coupled to the first element. Next, a second mold chamber is formed about at least a portion of the first element, and more specifically, about a portion of the first connecting member. A second curable material is then injected into the second mold chamber in a second shot of the molding operation to form the second element, i.e. the other of the compartment body or cover, having a second integrated connecting member. The second element is formed so that the first connecting member and the second connecting member are pivotally coupled together. The ashtray having the electroluminescent lamp incorporated therein may then be installed into an automotive trim assembly, such as a door panel.

By virtue of the foregoing, there is thus provided an improved automotive ashtray with a lighting system having a reduced number of parts and that is adapted to be coupled to an interior trim assembly of a vehicle. The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
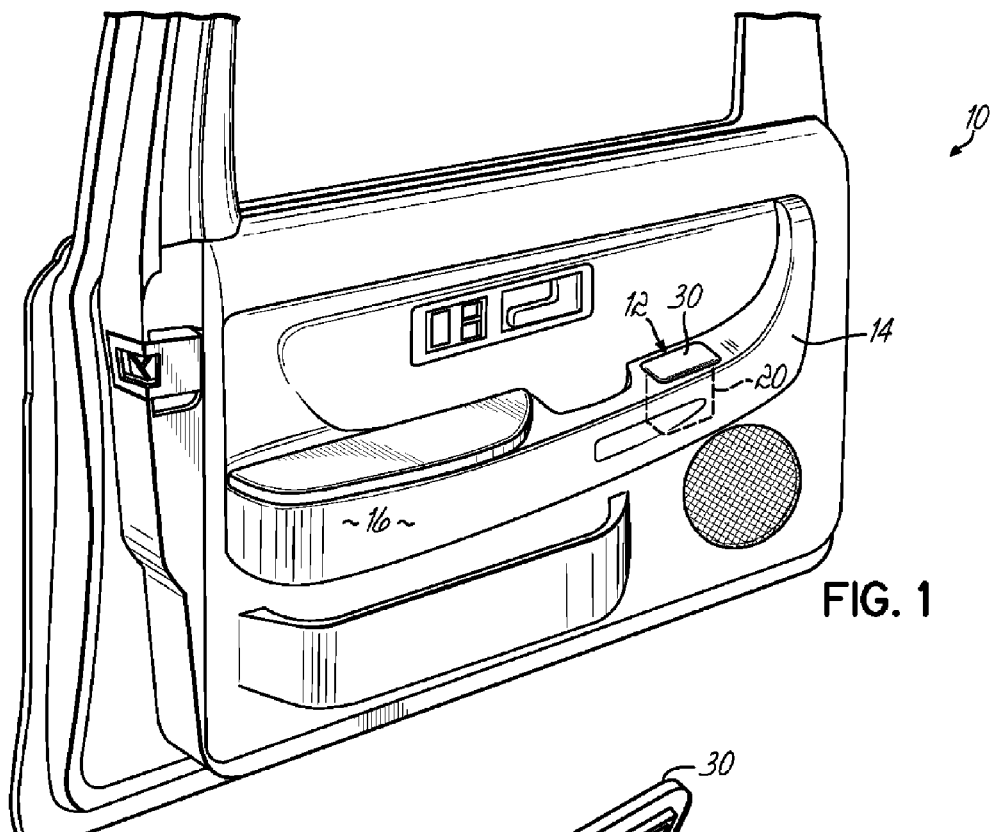
FIG. 1 is a side perspective view of an automotive trim assembly including an embodiment of the ashtray of the present invention in the form of a door panel.

In FIG. 1, there is shown an interior trim assembly, in the form of a door panel 10 for an automobile (not shown), including an embodiment of the automotive ashtray 12 of the present invention within a support 14 of door panel 10. The door panel 10 covers a portion of the interior of the automobile door to provide a more aesthetically pleasing environment, as well as additional comfort to the vehicle's occupants. Other various trim assemblies in the automobile, such as instrument panels, rear passenger side panels and consoles, are generally constructed in a similar fashion and may benefit from the present invention. Thus, while the following detailed description focuses on the ashtray 12 being included in a door panel 10, those having ordinary skill in the art will recognize that the ashtray 12 may equally be incorporated in other automotive trim assemblies.

The door panel 10 includes a support 14 including a relatively rigid substrate, which receives the ashtray 12 and which forms at least a portion of the structural support and defines the general shape of the door panel 10. The door panel 10 may be secured to the interior of the automobile, for example, by a bracket or mounting member (not shown) as is known in the art. The door panel 10 further includes a front surface 16 that faces the interior of the automobile and a back surface (not shown) opposite the front surface 16 that is hidden from view when the panel assembly 10 is mounted to the automobile.

Figure 2:
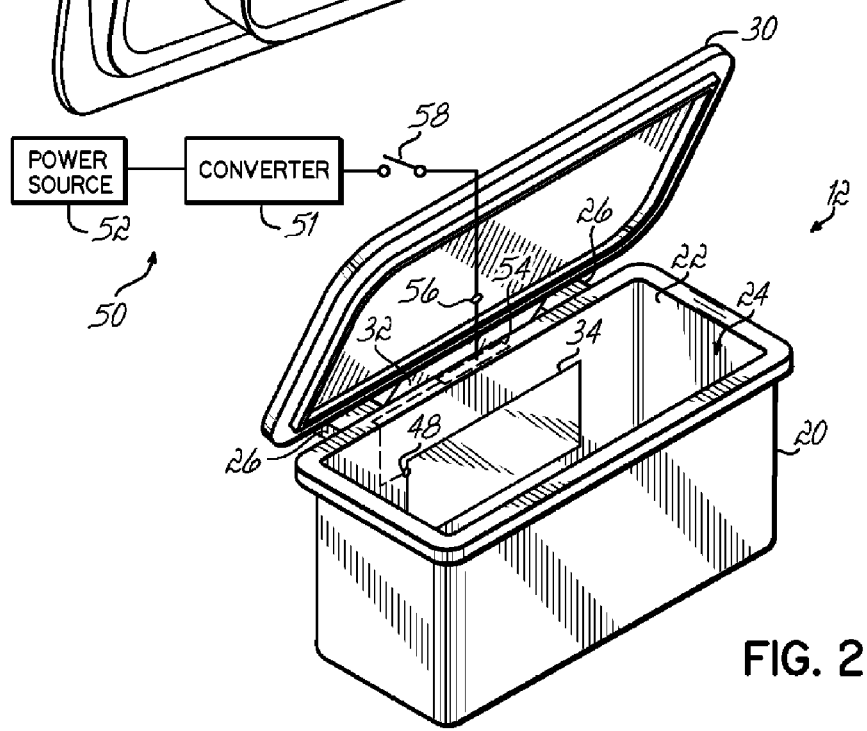
FIG. 2 is a perspective view of the ashtray of FIG. 1 showing the electroluminescent lamp.

As best shown in FIG. 2, the ashtray 12 includes a compartment body 20 defining a cavity 22 having an opening 24 for gaining access to the cavity 22. The cavity 22 is adapted to store one or more items such as coins, cigarette and cigar butts and ashes, and the like. The compartment body 20 further includes a pair of spaced apart connecting members 26 integrally formed therein. While two connecting members 26 are shown in FIG. 2, it should be understood by those of ordinary skill in the art that one connecting member or more than two connecting members may be integrally formed with the compartment body 20. The compartment body 20 is made of a thermoplastic material such as a thermoplastic synthetic resin. For example, the compartment body 20 may be formed from polycarbonate/acrylonitrile butadiene styrene to be heat resistant to lit cigars and cigarettes as well as hot ashes. The ashtray 12 also has a cover 30 including one connecting member 32 integrally formed therein. It similarly should be understood by those having ordinary skill in the art that more than one connecting member 32 may be integrally formed with the cover 30. The cover 30 is made of a thermoplastic material such as a thermoplastic synthetic resin. For example, the cover 30 may be formed from polypropylene, polyoxymethylene, or polyamide 6.

As more fully explained in U.S. patent application Ser. No. 10/710,499, which is assigned to assignee of the present invention and incorporated by reference herein in its entirety, each integral connecting member 26 of the compartment body 20 includes a projecting portion defining a pin having an enlarged distal end configured as a circular portion or ball. The integral connecting member 32 of the cover 30 includes a pair of spaced apart receiving portions defining a bore having an enlarged receiving portion configured as a circular recess. Accordingly, the connecting members 26 of the compartment body 20 cooperate with the connecting member 32 of the cover 30 to couple the cover 30 to the compartment body 20, and more specifically, each circular recess receives one of the circular portions to pivotally couple the cover 30 to the compartment body 20. In this way, the cover 30 is moveable between an open position, wherein the cavity 22 is accessible through the opening 24, and a closed position, wherein the cover 30 overlies the opening 24. The ashtray 12 may further include one or more hinge springs (not shown) cooperating with the compartment body 20 and the cover 30 to assist with movement of the cover 30 from the open position to the closed position.

Figure 3:
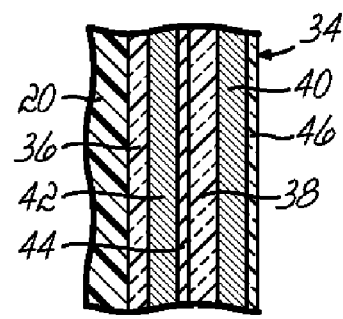
FIG. 3 is a detailed partial cross-sectional view of the electroluminescent lamp shown in FIG. 2.

As shown in FIG. 2, to provide lighting to the ashtray 12, an electroluminescent (EL) lamp, generally shown at 34, may be coupled to the compartment body 20 and configured to illuminate the various items placed inside cavity 22. Although the EL lamp 34 is shown coupled to the compartment body 20, it should be recognized that the EL lamp 34 may alternately be coupled to cover 30. As shown in FIG. 3, the EL lamp 34 consists of a stacked structure of multiple layers carried on a suitable flexible structural substrate 36. The layered structure includes a layer of EL phosphor 38 disposed between substantially parallel front and rear electrodes 40 and 42, respectively. The phosphor layer 38 is contiguous with the front electrode 40 but spaced from, and electrically isolated from, the rear electrode 42 by a dielectric layer 44. The front electrode 40, which faces into the interior of cavity 22, is light transmissive (i.e., transparent or translucent) for transmitting light emitted from the phosphor layer 38 when an electric field is applied between the front and rear electrodes 40, 42. The dielectric layer 44 may be pigmented to supply a dark or colored background for the emitted light.

A protective encapsulation layer 46 of a light-transmissive substance, such as a polycarbonate or another polymer suitable for this application, optionally covers the front electrode 40 of the EL lamp 34. The encapsulation layer 46 may be applied to the stacked structure as a printed ink layer. An electrical connector 48, shown diagrammatically in FIG. 2, such as an edge electrical connector, includes power contacts that are coupled with the front and rear electrodes 40, 42. The power contacts of the electrical connector 48 are exposed through the encapsulation layer 46 for establishing electrical contacts.

The layers of the EL lamp 34 may be printed onto the EL substrate 36 by rotary screen printing, flexographic printing, or other printing methods using conducting, insulating and electroluminescent ink compositions. The ink compositions are printed across a desired print area on the EL substrate 36 and then dried to remove volatile solvents for forming stable layers. Some of the layers in the stacked structure may be printed more than once in order to assure proper thickness. Phosphor ink compositions are available to emit light in many colors, such as green, blue, and yellow, and may also be blended to produce white light emission. Typical EL phosphors comprise zinc sulfide-based materials doped to create the desired color emission. Suitable EL phosphor ink compositions include white, blue-green and yellow-green LUXPRINT® electroluminescent inks commercially available from DuPont Microcircuit Materials (Research Triangle Park, N.C.)

In one embodiment of the invention, a flexible metallized film may effectively function as the EL substrate 36, the rear electrode 42 and the dielectric layer 44 of the EL lamp 34. Such metallized films include a thin layer of a metallic conductive material, like aluminum, deposited on one side of a film material, like polyester. The deposited metallic layer operates as the rear electrode 42 and the film material acts as the dielectric layer 44. The metallized film also serves as a EL substrate 36 for application of the remaining printed component layers of the stacked structure.

Referring again to FIG. 2, the trim assembly further includes an electrical circuit 50, including an inverter or converter 51, that electrically couples a power source 52, such as the vehicle battery, with the electrical connector 48. To this end, the compartment body 20 includes a first electrical connector 54, such as a pin connector, that is electrically coupled to the EL electrical connector 48. For example, the first electrical connector 54 may be positioned on the underside of the rim of compartment body 20. Furthermore, the trim assembly may include a second electrical connector 56, shown diagrammatically in FIG. 2, electrically coupled to power source 52. For example, second electrical connector 56 may be positioned in support 14 into which ashtray 12 is to be inserted. First and second electrical connectors 54, 56 are configured such that when ashtray 12 is inserted into door panel 10, the first electrical connector 54 engages, or is otherwise coupled to, electrical connector 56 so as to energize the EL lamp 34. Electrical circuit 50 may further include a switch 58 for selectively energizing the EL lamp 34. For example, power to the EL lamp 34 may be switched in coordination with the operation of the cover 30 to the ashtray 12 so that the EL lamp 34 is energized only when the cover 30 is opened. Additional circuitry, as recognized by persons of ordinary skill in the art, may be provided as required to ensure proper operation of the EL lamp 34.

The converter 51 electrically couples a direct current (DC) electrical system of the vehicle, such as the vehicle battery, with the electrical connector 48. The coverter 51 converts the DC voltage from the electrical system to generate an alternating current (AC) driving voltage in the range of 80 to 200 VAC, preferably about 110 VAC, at a frequency in the region of 300 to 500 Hz, preferably about 400 Hz. Application of the AC driving voltage across the front and rear electrodes 40, 42 of the EL lamp 34 generates a varying electric field within the phosphor layer 38 causing the constituent phosphor particles to emit visible light. In general, the brightness of the EL lamp 34 increases with increased voltage and frequency.

The visible light emitted by the EL lamp 34 uniformly and effectively illuminates the inside of the cavity 22. The EL lamp 34 has a low power consumption and a very low heat generation as compared with conventional lamps used in such automotive applications. Furthermore, the EL lamp 34 is sturdy and exhibits excellent vibration and impact resistance. The EL lamp 34 will have a lengthy life and, as a result, will not normally need replacement over the life of the automobile, in contrast to the need to periodically replace burnt-out conventional incandescent bulbs. The EL lamp 34 also has a cooler operating temperature than conventional incandescent bulbs.

Figure 4A:
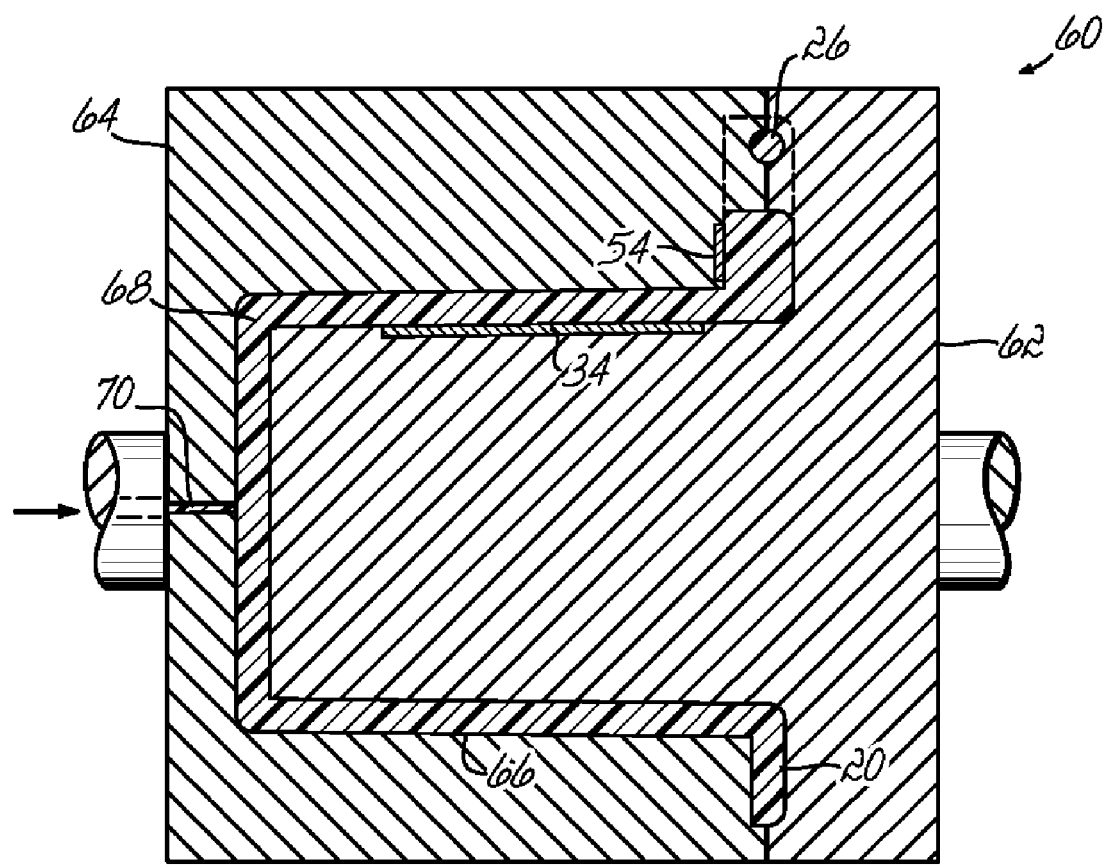
FIGS. 4A–4C are diagrammatic cross-sectional views illustrating a molding process for forming the ashtray of the present invention.
Figure 4B:
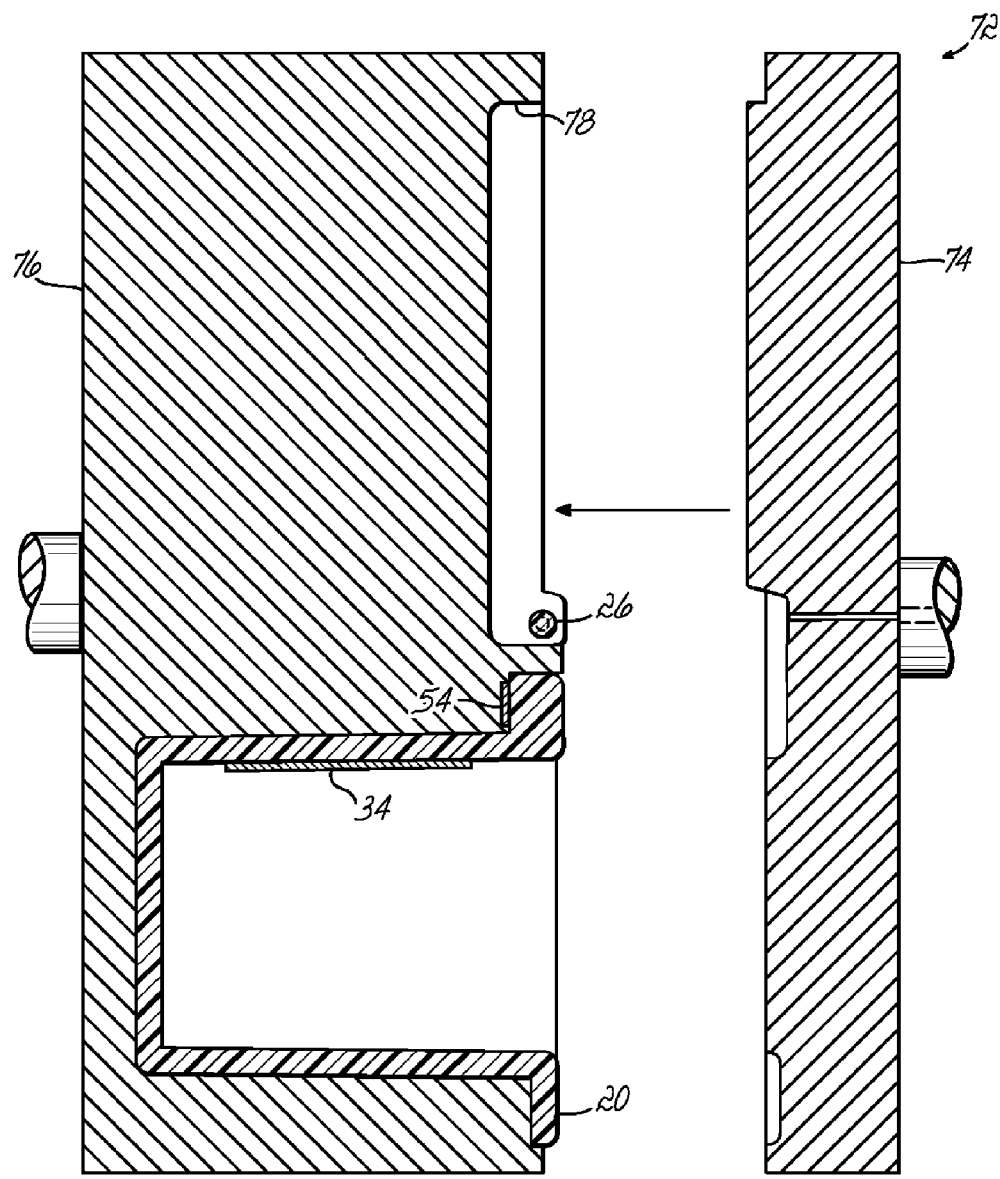
Figure 4C:
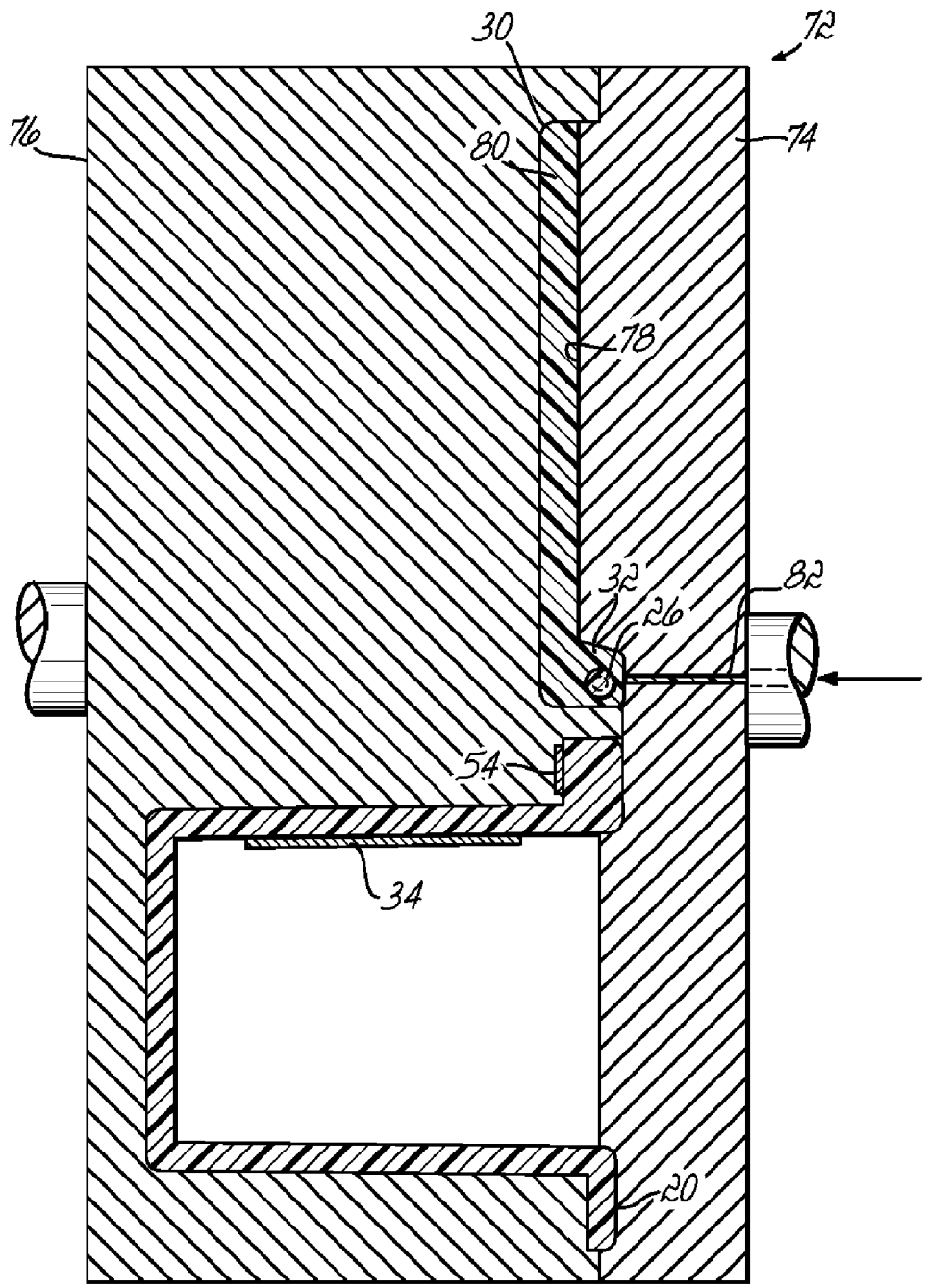

With reference to FIGS. 4A–4C, a method of making the ashtray 12 of the present invention will now be described. More specifically, the ashtray 12 is formed by a two-shot molding operation wherein a first shot molds one of either the compartment body 20 or the cover 30. The EL lamp 34 is integrally molded to either the compartment body 20 or the cover 30 during the first shot. A second shot then molds the other of the compartment body 20 or cover 30 to couple the parts together.

To this end, and as shown in FIG. 4A, a first mold 60 is shown having first and second mold sections 62 and 64, respectively, that define a first mold chamber or cavity 66 adapted to mold a first element, i.e., the compartment body 20, in the first shot. The EL lamp 34 is placed at a specific location between the first and second mold sections 62, 64 and the mold 60 is closed. A first curable material 68 is then injected through a channel 70, into the first cavity 66. The first curable material 68 may be any engineering polymer material suitable for the specific application, such as polycarbonate/acrylonitrite butadiene styrene. The injection molding process creates sufficient pressure and heat to bond the EL lamp 34 and the first curable material 68 to form the compartment body 20 and EL lamp 34 as an integral structure. Alternately, first mold 60 may be configured so that first curable material 68 overmolds a portion of EL lamp 34, such as along its periphery to couple the EL lamp 34 thereto. Additionally, first electrical connector 54 may be positioned at a specific location between first and second mold sections 62, 64 so that first electrical connector 54 is molded to compartment body 20.

With reference to FIGS. 4B–4C, after the compartment body 20 is molded having the EL lamp 34 integrally molded thereto, the compartment body 20 is moved to the second mold 72 having first and second mold sections 74 and 76, respectively, that define a second mold chamber or cavity 78 adapted to mold a second element, i.e., the cover 30, in the second shot of the molding process. Movement of the compartment body 20 to the second mold 72 can occur by methods commonly known in the art such as by hand, i.e. manually, by robotic means, or by utilizing a rotating mold assembly. With respect to the rotating mold assembly (not shown), the first element, e.g. the compartment body, may be formed in a first mold as stated above. The first mold is then opened and the first element, rather than being manually or robotically moved, is rotated, e.g. 180 degrees, on a rotating platen to coordinate with a second mold to form the second element, e.g. the cover. The rotating mold assembly advantageously allows for simultaneous molding of first and second elements.

After the compartment body 20 has been moved to the second mold 72, a portion of the connecting members 26 is received within the second cavity 78 of the second mold 72 so that when the second mold 72 is closed, second cavity 78 is formed around a portion of connecting members 26. A second curable material 80 is then injected through a channel 82 and into second cavity 78. As explained in more detail in U.S. patent application Ser. No. 10/710,499, this second curable material 80 has a lower melting point than the first curable material 68. Accordingly, the second material 80 is provided at a lower temperature than the melting point of the first material 68 so as to avoid fusion of the connecting members 26, 32 on the compartment body 20 and cover 30, respectively. The second material 80 may be a thermoplastic material such as polypropylene, polyoxymethylene, polyamide 6 or other suitable materials.

After the ashtray 12 is formed, the second mold 72 may be opened and the ashtray 12 ejected therefrom. The two-shot molding process advantageously provides a unitary ashtray 12 comprising a compartment body 20, a cover 30 pivotally coupled thereto, and an EL lamp 34 integrally molded to the compartment body 20 to illuminate the items stored therein. The unitary ashtray 12 may now be received within support 14 of the door panel 10 during assembly of door panel 10. Those having ordinary skill in the art will recognize that the ashtray 12 may equally be included in other automotive trim assemblies, e.g. instrument trim lamps, rear passenger side lamps, center consoles and others.

Although the above method has described molding the first element as the compartment body 20 and molding the second element as the cover 30, it should be understood that the cover 30, alternatively, could be molded as the first element while the compartment body 20, alternatively, could be molded as the second element. Moreover, the EL lamp 34 may be molded to either the compartment body 20 or cover 30 during the first or second shot of the molding operation.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. An automotive interior trim assembly, comprising:
   a support; and
   an ashtray coupled to said support and adapted to store one or more items, said ashtray comprising:
      a compartment body defining a cavity adapted to store the one or more items and having an interior surface and an opening for gaining access to said cavity;
      a cover coupled to said compartment body and moveable between an open position, wherein said cavity is accessible through said opening, and a closed position, wherein said cover overlies said opening; and
      an electroluminescent lamp coupled to said interior surface of said cavity and adapted to illuminate said cavity when said cover is in the open position.

2. The trim assembly of claim 1, wherein said electroluminescent lamp is molded with the interior surface of said cavity.

3. The trim assembly of claim 1 further comprising:
   an electrical circuit for energizing said electroluminescent lamp.

4. The trim assembly of claim 3, wherein said electrical circuit comprises
   a power source;
   a first electrical connector coupled to said compartment body and electrically coupled to said electroluminescent lamp; and
   a second electrical connector coupled to said support and electrically coupled to said power source, wherein said first electrical connector is electrically coupled to said second electrical connector when said ashtray is coupled to said support so as to energize said electroluminescent lamp.

5. The trim assembly of claim 3, further comprising:
   an electrical switch having a first position that energizes the electroluminescent lamp and a second position that de-energizes the electroluminescent lamp.

6. The trim assembly of claim 5, wherein said electrical switch is in the first position when said cover is in the open position and said electrical switch is in the second position when said cover is in the closed position.

7. An automotive interior trim assembly, comprising:
   a support; and
   an ashtray coupled to said support and adapted to store one or more items, said ashtray comprising:
      a compartment body defining a cavity adapted to store the one or more items and having an interior surface and an opening for gaining access to said cavity, said compartment body including a first connecting member integrally formed therein; and
      a cover including a second connecting member integrally formed therein, said first connecting member cooperating with said second connecting member to couple said cover to said compartment body, said cover being moveable between an open position, wherein said cavity is accessible through said opening, and a closed position, wherein said cover overlies said opening; and
      an electroluminescent lamp coupled to said interior surface of said cavity and adapted to illuminate said cavity when said cover is in the open position.

* * * * *